US008400118B2

(12) United States Patent
Kamimura

(10) Patent No.: US 8,400,118 B2
(45) Date of Patent: Mar. 19, 2013

(54) OUTPUT CONTROL APPARATUS OF GENERATOR

(75) Inventor: Kenji Kamimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 354 days.

(21) Appl. No.: 12/872,543

(22) Filed: Aug. 31, 2010

(65) Prior Publication Data

US 2011/0101928 A1    May 5, 2011

(30) Foreign Application Priority Data

Oct. 29, 2009  (JP) ................................ P2009-249060

(51) Int. Cl.
*H02P 11/00* (2006.01)
*H02P 9/00* (2006.01)
*H02H 7/06* (2006.01)

(52) U.S. Cl. .......................................... 322/24; 322/28
(58) Field of Classification Search .................... 322/24, 322/28

See application file for complete search history.

(56) References Cited

U.S. PATENT DOCUMENTS

| 5,491,400 A * | 2/1996 | Iwatani et al. ................... 322/28 |
| 5,497,071 A * | 3/1996 | Iwatani et al. ................... 322/28 |
| 5,581,172 A * | 12/1996 | Iwatani et al. ................... 322/28 |
| 6,344,734 B1 * | 2/2002 | Iwatani et al. ................... 322/28 |
| 6,700,355 B2 * | 3/2004 | Aoyama et al. .................. 322/36 |
| 6,700,357 B2 * | 3/2004 | Taniguchi ....................... 322/99 |
| 6,812,675 B2 * | 11/2004 | Okamoto et al. ............... 322/28 |
| 7,368,893 B2 * | 5/2008 | Tsuzuki .......................... 322/28 |
| 8,040,112 B2 * | 10/2011 | Kikuchi et al. ................. 322/34 |
| 2007/0001643 A1 | 1/2007 | Buerk et al. .................... 318/811 |

FOREIGN PATENT DOCUMENTS

| EP | 1 876 701 A2 | 1/2008 |
| JP | 3-253300 A | 11/1991 |
| JP | 6276800 A | 9/1994 |
| JP | 7245995 A | 9/1995 |
| JP | 8-140400 A | 5/1996 |
| JP | 2009-183128 A | 8/2009 |
| JP | 2011097738 A * | 5/2011 |

* cited by examiner

Primary Examiner — Pedro J Cuevas
(74) Attorney, Agent, or Firm — Arent Fox LLP

(57) ABSTRACT

An excitation winding (104) and a field winding (102) are provided. A smoothing capacitor (113) smoothes a current of the excitation winding (104) and inputs it to the field winding (102). A transistor (110) is driven to control an output of the generator winding (103). A diode (112) prevents a field current from flowing in a reverse direction. A transistor (10) connected to the diode (112) is driven in a phase reverse to a phase of a drive signal of the transistor (110). A duty monitor 1 determines whether a duty ratio of the drive signal of the transistor (110) is larger than a reference duty ratio, and when the duty monitor 1 determines that the duty ratio of the drive signal is larger than the reference duty ratio, an unit (2) extends an output cycle of the drive signal by thinning out the drive signal.

2 Claims, 4 Drawing Sheets

PRIOR ART

OUTPUT CONTROL APPARATUS OF GENERATOR

TECHNICAL FIELD

The invention relates to an output control apparatus of a generator and more particularly to an output control apparatus of a generator having a stabilization unit of an output voltage in consideration of an influence of a magnetizing action when a phase advance load is connected.

BACKGROUND ART

An automatic voltage regulator (hereinafter, also called "AVR") is known which keeps a voltage output from a generator winding to a previously set voltage by controlling a current supplied to a field winding by a voltage generated to an excitation winding.

An operation of an alternating-current generator having a conventional AVR (hereinafter, also called "AVR generator") will be described referring to a drawing. In FIG. 7, a generator 100 includes a field winding 102, a generator winding 103, and an excitation winding 104. Permanent magnets 106 are disposed to a rotor 105 around which the field winding 102 is wound. A rectifier 109a, a transistor drive unit (control unit) 109, and a transistor 110 are disposed to an AVR 107. The excitation winding 104 is connected to an input side of a rectifier 108, and the field winding 102 is connected to an output side of the rectifier 108 through a brush 111. A flywheel diode 112 and a smoothing capacitor 113 are connected in parallel with the field winding 102.

When the rotor 105 is rotated by a not shown drive source such as an engine, an electro-motive force is generated to the excitation winding 104 by the permanent magnets 106 disposed on outer peripheral surfaces of the rotor 105. The electro-motive force is rectified and smoothed by the rectifier 108 as well as the flywheel diode 112 and the smoothing capacitor 113. When the transistor 110 is turned on, a current is caused to flow to the field winding 102 by the electro-motive force, and excitation is executed by a large magnetic field in addition to excitation executed by a magnetic force of the permanent magnets 106. A positive feedback is applied to a field as described above, and an output voltage of the generator winding 103 increases. The output voltage is rectified by the rectifier 109a, input to the transistor drive unit 109, and compared with a voltage target value. When the output voltage reaches the voltage target value, the transistor 110 is turned off. As a result, the output voltage of the generator winding 103 is decreased and the transistor 110 is turned on again. As described above, the transistor 110 is repeatedly turning on and off, and a constant voltage control is executed.

Generators having the AVR are disclosed in, for example, Patent Documents 1, 2, 3, 4, and the like.

CITATION LIST

Patent Documents

Patent Document 1 Japanese Patent Application Laid-open No. 8-140400
Patent Document 2 Japanese Patent No. 2996574
Patent Document 3 Japanese Patent No. 3043566
Patent Document 4 Japanese Patent Application Laid-open No. 3-253300

SUMMARY OF INVENTION

Technical Problem

Since the conventional AVR generator has a simple configuration, the AVR generator has become widely spread and can obtain good constant voltage characteristics particularly in a high power factor load. However, in a case of low power factor load, a voltage greatly changes by magnetization and demagnetization. In particular, when a phase advance load is connected to the generator, an electro-motive force is generated in the field winding 102 by a magnetic flux caused by a phase advance current flowing in the generator winding 103, and the electro-motive force is rectified by the flywheel diode, made to a current having the same phase as that of a field current, increases a field magnetic flux (magnetization), and increases an output voltage.

When the output voltage exceeds a voltage target value, the transistor 110 keeps it off, and a field drive executed by the excitation winding 104 is stopped. However, if the phase advance load has a large capacity, then the field winding 102 is continuously excited only by a current generated in the field winding 102 by phase advance current. As described above, since the current generated in the field winding 102 increases also voltage across the smoothing capacitor 113, there is a possibility that the smoothing capacitor 113 experiences an excessive voltage. Thus, a countermeasure to the problem is desired.

To suppress an increase of the output voltage caused by the phase advance load, in a conventional technique described in Patent document 4, the AVR is provided with a magnetization suppressing function, and a magnetic flux generated in the field winding is decreased by the phase advance load that flows a current in a direction reverse to a direction of a current flowing to the field winding.

However, timing at the reverse direction current flows in the field winding may coincide timing at which a field drive current is caused to flow by a PWM signal (timing signal of an on-time duty control of the transistor 110). In the case, since the field current cannot be cancelled by the reverse direction current and thus an effect of suppressing an increase of the output voltage becomes small, this is a problem to be solved.

A phase of the electro-motive force generated in the field winding is determined by mechanical phases of the rotor and a stator, an electrostatic capacitance of the load, inductances of the rotor and the stator, and the like. Typically, a general phase advance load is assumed, and the rotor is assembled to the stator by aligning the phase of the rotor to the phase of the stator so that timing at which a drive signal of the transistor 110 is provided does not coincide timing at which the reverse direction current is caused to flow. However, when a phase advance load out of assumption is connected, a current, which is generated by the phase advance load that increases the field current may not be cancelled.

To solve the afore-mentioned problem, an object of the invention is to provide an output control apparatus of a generator capable of suppressing an increase of an output voltage when a phase advance load is connected to the generator.

Solution to Problem

The present invention has a first feature in that an output control apparatus of a generator including a generator winding and an excitation winding wound around a stator side, a field winding wound around a rotor rotated by a drive source, a rectifier for rectifying a current generated by the excitation winding, a smoothing capacitor for smoothing an output current of the rectifier and inputting the smoothed output current to the field winding, a first switching device connected to the field winding and PWM controlled to converge an output voltage of the generator winding to a target voltage, and a flywheel diode connected to the field winding, the output control apparatus of a generator comprising: a second switching device connected in parallel to the flywheel diode and driven in a phase reverse to a phase of the PWM controlled drive signal; a duty ratio monitoring unit which determines whether a duty ratio of a drive signal of the first switching device is equal to or larger than a reference duty ratio; and PWM output cycle extension unit which prolongs an output cycle of the drive signal when the duty ratio monitoring unit determines that a duty ratio of the drive signal is not equal to or larger than the reference duty ratio longer than the output cycle of the drive signal when the duty ratio monitoring unit determines that the duty ratio of the drive signal is equal to or larger than the reference duty ratio.

The present invention has a second feature in that the PWM output cycle extension unit comprises a drive signal thinning out unit which prolongs the output cycle of the drive signal by thinning out the drive signal at predetermined intervals.

Advantageous Effects of Invention

A phase advance current is caused to flow to the generator winding by connecting a phase advance load, and a current having the same phase as that of a field drive current (current from the excitation winding) is caused to flow through the flywheel diode by a magnetic flux caused by the phase advance current.

In the invention having the first feature, when a large phase advance load is connected, a second switching device connected across the field winding is driven in an inverted phase of a drive signal of a first switching device. When the second switching device is turned on, a phase advance current flowing to the field winding flows through the flywheel diode. Accordingly, a positive direction current of the phase advance current passes through the flywheel diode, and a negative direction current of the phase advance current flows through the second switching device. As a result, since a magnetic field caused by phase advance is cancelled, magnetization caused by the phase advance current is suppressed.

In particular, according to the invention, a connection of a large phase advance load is determined by that a duty ratio of a drive signal is smaller than a reference duty ratio, and when the connection of a large phase advance load is determined, an output cycle of the first switching device is prolonged. When the output cycle of the first switching device is prolonged, a period, during which the second switching device driven by phase reverse to that of the first switching device, is extended. As a result, since on-timing of the first switching device is unlike to coincide timing at which a cancel current of the phase advance current flows to the field winding after the second switching device is turned on, the phase advance current is effectively cancelled.

With this operation, it is avoided that an output current is excessively increased by the field current that flows while the first switching device is off and that the smoothing capacitor is excessively charged.

According to the invention having a second feature, an output cycle of a PWM signal can be easily extended by thinning out the drive signal at every predetermined interval.

DESCRIPTION OF EMBODIMENTS

Figure 1:
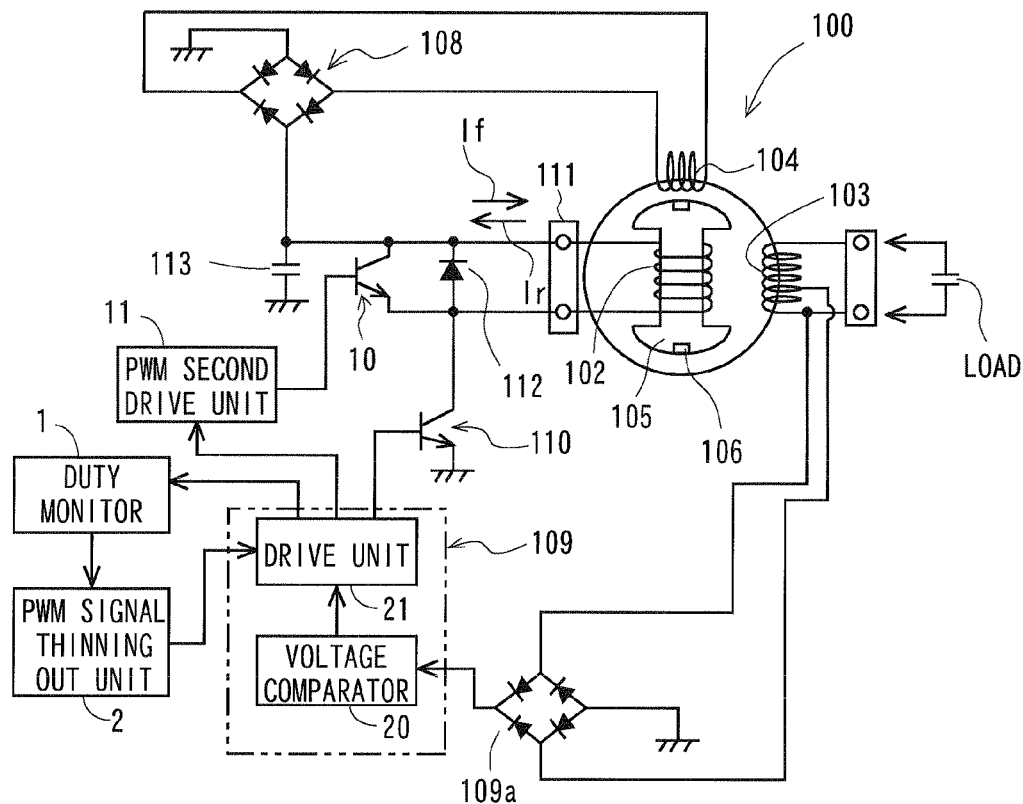
FIG. 1 is a block view showing a system configuration of a generator having an output control apparatus according to an embodiment of the invention.

An embodiment of the invention will be described below referring to the drawings. FIG. 1 is a system configuration view of a generator having an output control apparatus according to the embodiment of the invention, and the same reference numerals as those of FIG. 10 indicate the same components or equivalent components of FIG. 10.

As described above as "Background Art", in the AVR generator of the conventional technique, when a phase advance load is connected, an output voltage may be increased undesirably. To cope with the problem, in the embodiment, a closed circuit having a field winding 102 is formed by connecting a transistor (second switching device) 10 across a flywheel diode 112 and by turning on the transistor 10 in a period during which a transistor (first switching device) 110 is turned off, that is, by turning on the transistor 110 at timing at which a current from an excitation winding 104 is not caused to flow to the field winding 102.

The closed circuit is formed to cancel a magnetic flux caused by a phase advance current by turning on the transistor 10 while the transistor 110 is off so that a current Ir in a direction reverse to a positive direction current If which flows in the field winding 102, that is, the negative direction current Ir flows to the field winding 102, by taking notice of that a current (hereinafter, called "phase advance current") generated in the field winding 102 through a generator winding 103 by the phase advance load is an alternate current. Since magnetization is suppressed by the configuration mentioned above, an increase of the output voltage to an output voltage higher than an assumed output voltage can be prevented, and an increase of voltages across a capacitor 113 can be also prevented.

Since the transistor 10 is a switching device for canceling the phase advance current, it is called a "cancel transistor" below. The cancel transistor 10 is turned on in response to turning off of the transistor 110 is turned off and is turned off in response to turning on of the transistor 110.

It is limited to when the transistor 110 is turned off that the transistor 10 is turned on to flow the negative direction current Ir for canceling the positive direction current If of the phase advance current. However, even if timing for turning on and off the transistor 10 coincides with timing for turning on and off the transistor 110, a phase of an electro-motive force generated to the field winding 102 is not fixed due to mechanical phases of a rotor and a stator, an electrostatic capacitance of a load, inductances of the rotor and the stator, and the like. Therefore, when an expected phase advance load is connected, a current, which is caused to flow by the phase advance load, may not be cancelled.

To cope with the problem, in the embodiment, timing at which the negative direction current Ir flows is prevented from coincidence of timing at which the transistor 10 is turned on by thinning out a PWM signal (pulse).

It is considered that when a cycle of the PWM signal is prolonged at all times, a control performance of the output voltage controlled by a duty ratio is influenced by the extension of the cycle. However, when a capacitive load is connected, because of a domination of a reactive current, a duty ratio of the PWM signal is also become small. Accordingly, when the cycle of the PWM signal is prolonged only at the time at which the duty ratio of the PWM signal is small, a minute amount of power is supplied from the excitation winding 104 to the field winding 102. Therefore, even if the cycle of the PWM signal is prolonged, the control performance of the output voltage is influenced only slightly.

Thus, when the duty ratio of the cancel transistor 10 is decreased lower than a predetermined value, a process for preventing timing at which a field current is cancelled by an on-signal of the transistor 10 from coincidence of timing at which the PWM signal is turned on by prolonging the output cycle of the PWM signal.

To execute the process, a duty monitor 1 for monitoring an on-time duty ratio (hereinafter, simply called "duty ratio") of the PWM signal of the transistor 110 is provided in an AVR 107 of a generator 100.

A transistor drive unit, that is, a control unit 109 has a voltage comparator 20 for comparing a magnitude of an output voltage of the generator winding 103 with a magnitude of a target voltage and a drive unit 21 for determining an increase or a reduction of the duty ratio of the transistor 110 in response to the magnitudes of the voltages, increasing or decreasing a predetermined amount of the duty ratio, and supplying a drive signal to the transistor 110. The transistor 110 is driven according to the duty ratio determined by the control unit 109 and controls the field current.

A PWM second drive unit 11 has a function for detecting output timing (on-time) of an on-command and output timing (off-time) of an off-command which are output from the control unit 109 to the transistor 110 and a function for outputting the on-command to the cancel transistor 10 at the off-time and outputting the off-command to the cancel transistor 10 at the on-time.

The duty monitor 1 monitors the duty ratio output from the drive unit 21 and outputs a detection signal when the duty ratio is smaller than a preset appropriate duty ratio. Since the duty ratio is ordinarily set to about 20% when no load is applied, a reference duty ratio is preferably about 10% smaller than the duty ratio when without loading. The detection signal output from the duty monitor 1 is input to a PWM signal thinning out unit 2. The PWM signal thinning out unit 2 is configured to thin out or to prohibit outputting the PWM signal, which is output in a predetermined cycle, in, for example, each one cycle. An output cycle of the PWM signal output from the drive unit 21 is doubled by the thinning out process.

Figure 2:
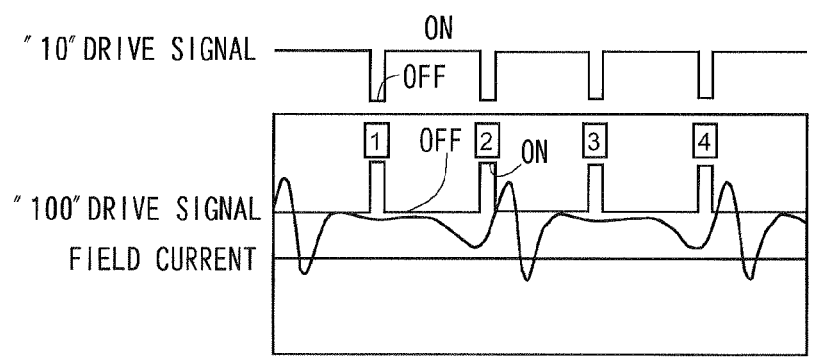
FIG. 2 is a timing chart showing a relation between a drive signal of a transistor and a field current when a small phase advance load is connected.
Figure 3:
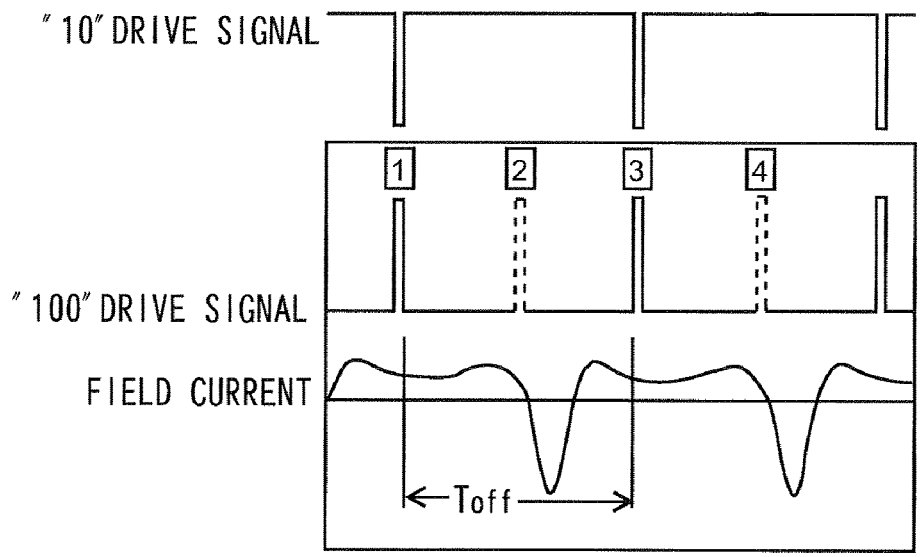
FIG. 3 is a timing chart showing the relation between the drive signal of the transistor and the field current when a large phase advance load is connected.

FIGS. 2 and 3 are timing charts showing a relation among a drive signal (PWM signal) of the transistor 110, a drive signal of the transistor 10, and a field current.

FIG. 2 is the timing chart when the relatively small phase advance load is connected. In an example shown in FIG. 2, the PWM signal of the transistor 110 is not thinned out, and the cancel transistor 10 is turned on and off in a phase reverse to a phase of the PWM signal which is not thinned out. In an on-period of the cancel transistor 10, since the negative direction current Ir flows in a small amount, a degree of reduction of magnetization caused by turning on the transistor 10 is small.

FIG. 3 is a timing chart when the large phase advance load is connected. In this case, since the phase advance load is large, the transistor 110 is driven at the duty ratio smaller than the reference duty ratio. As a result, the detection signal is output from the duty monitor 1, and the PWM signal is thinned out by the PWM signal thinning out unit 2. As shown by dotted lines in FIG. 3, since the PWM signal is thinned out at portions to which reference numerals "2", "4" are attached, the transistor 110 is driven in a cycle twice the cycle shown in FIG. 2. Accordingly, since a cancel effect of the positive direction magnetic field caused by the negative direction current Ir is increased, the field current is greatly decreased in a period Toff during which PWM signal is turned off as shown in FIG. 3.

Figure 4:
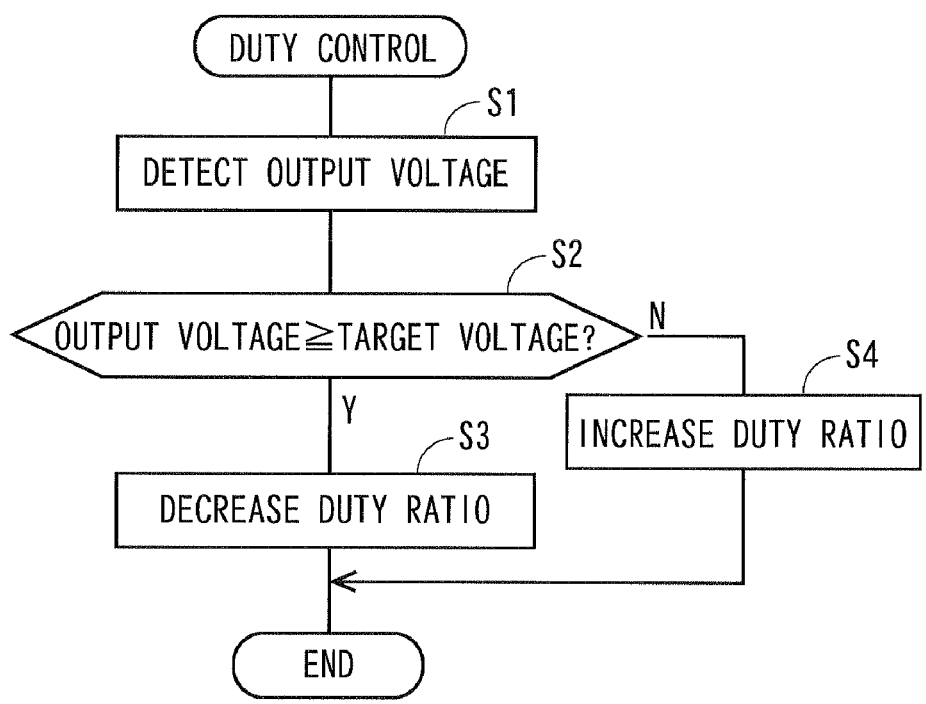
FIG. 4 is a flowchart according to a duty control of a PWM signal.

FIG. 4 is a flowchart according to a duty control in a PWM control of the transistor 110. In FIG. 4, in step S1, an output voltage of the generator winding 103 is input to the voltage comparator 20. In step S2, the voltage comparator 20 determines whether the output voltage is equal to or larger than the target voltage. When the determination in step S2 is affirmative, a process proceeds to step S3 and the duty ratio is decreased by a predetermined amount. When the determination in step S2 is negative, the process proceeds to step S4 and the duty ratio is increased by the predetermined amount.

Note that the duty ratio is not limited to a case that it is decreased or increased by executing the processing once, and when a magnitude of a difference between the output voltage and the target voltage is large, an increasing/decreasing amount may be increased and when the magnitude of the difference is small, the increasing/decreasing amount may be decreased according to the difference between the output voltage and the target voltage.

Figure 5:
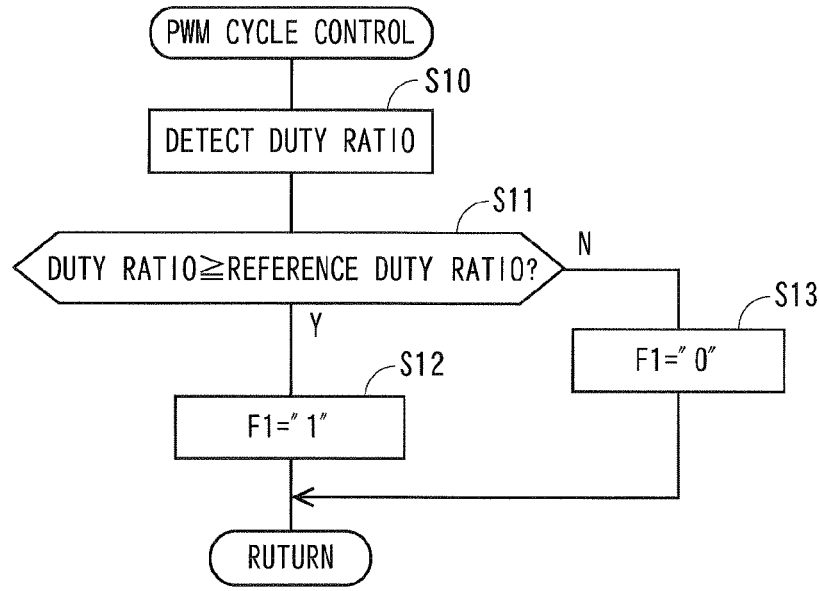
FIG. 5 is a flowchart according to a cycle control of the PWM signal.

FIG. 5 is a flowchart according to a thinning out control of the PWM signal. In FIG. 5, in step S10, a duty ratio of the PWM signal output from the control unit 109 is detected by a function of the duty monitor 1. In step S11, the duty monitor 1 determines whether the detected duty ratio is equal to or larger than the reference duty ratio. When the determination in step S11 is affirmative, the process proceeds to step S12 and a thinning out flag F1 of a PWM signal is set to "1". Note that the determination in step S11 may be set to affirmative when the duty monitor 1 continuously detects that the detected duty ratio is equal to or larger than the reference duty ratio for at least a predetermined time. When the determination in step S11 is negative, the process proceeds to step S13 and the PWM signal thinning out flag is set to "0".

Figure 6:
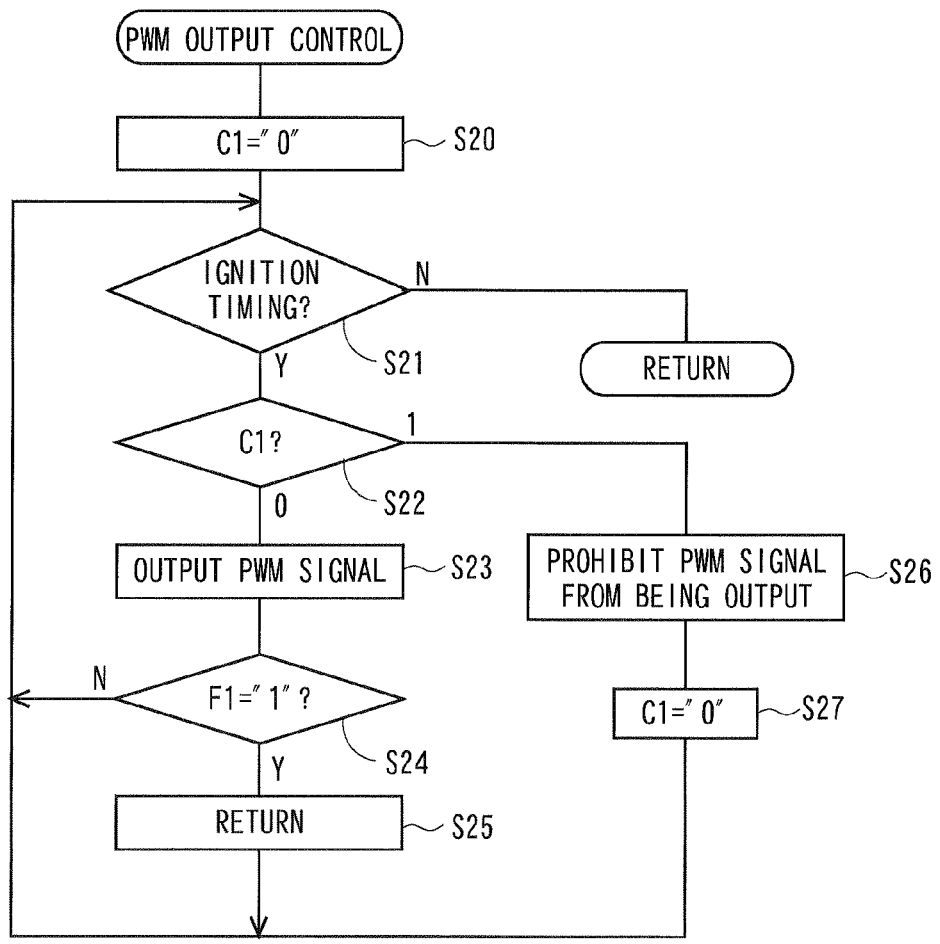
FIG. 6 is a flowchart according to an output control of the PWM signal.
Figure 7:
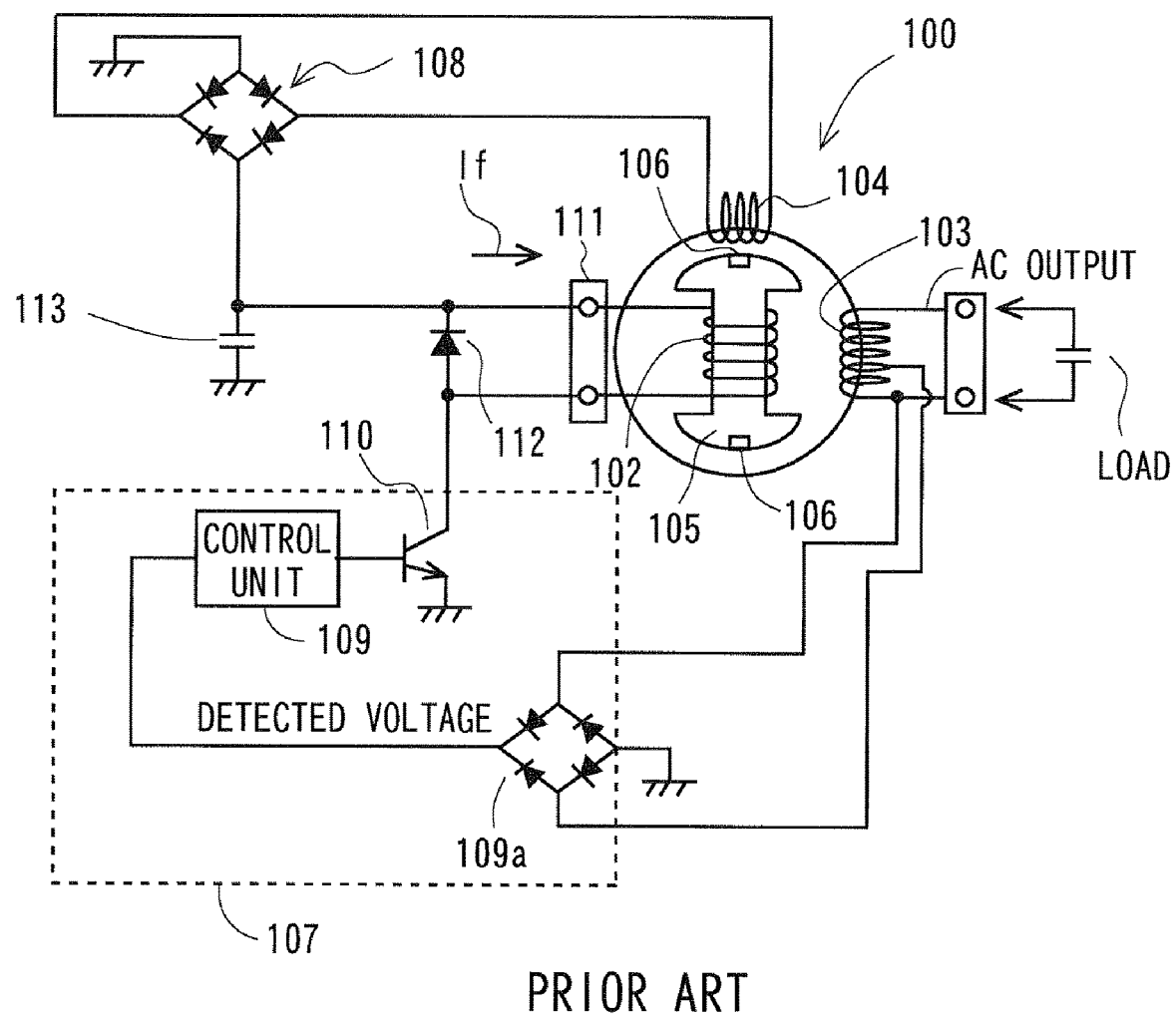
FIG. 7 shows a prior art of an alternating-current generator having an AVR.

FIG. 6 is a flowchart of an output control of the PWM signal. The PWM signal is output in synchronization with an output (ignition timing signal of an engine) of a rotation sensor which is disposed to an output shaft of the engine as a drive source for rotating the rotor 105 or on an outer periphery of a rotation member (flywheel and the like), which is coupled with the output shaft and rotates, and outputs a detection signal each time the rotation member rotates once.

In FIG. 6, in step S20, a thinning out register C1 is set to zero. The thinning out register C1 is set to "0" or "1". In step S21, whether an ignition timing signal is detected is determined. When the determination in step S21 is affirmative, the process proceeds to step S22 and determines whether the thinning out register C1 is set to "0" or to "1". When the thinning register C1 is set to "0", the process proceeds to step S23 and outputs the PWM signal to the transistor 110 at the duty ratio set by the duty control.

In step S24, whether the thinning out flag F1 is set to "1" or "0" is determined. When the thinning out flag F1 is set to "1", the process proceeds to step S25 and "1" to the thinning out register C1 is set to "1".

When the determination in step S22 is negative, the process proceeds to step S26 and the PWM signal is prohibited from outputting to the transistor 110. Then, in step S27, the thinning register C1 is set to "0".

When the determination in step S24 is negative, that is, when the thinning out flag F1 is set to "0", the process returns to step S21, skipping step S25.

As described above, in the output control of the PWM signal, when the thinning out flag F1 is raised, the output of the PWM signal to the transistor 110 is executed or prohibited in response to the status of the thinning out register C1 which are alternately changed. That is, since the PWM signal is thinned out once in every twice, the output cycle of the PWM signal is doubled.

Note that, although the example in which the output cycle is prolonged by thinning out the PWM signal in the embodiment, the invention is not limited thereto, and a present duty ratio may be compared with the reference duty ratio and any one of previously set output cycles having two type of lengths may be selected according to a result of the comparison. For example, the PWM signal may be output when an ignition timing signal is counted twice at the time the duty ratio is larger than the reference duty ratio, and the PWM signal may be output each time the ignition timing signal is detected at the time the duty ratio is smaller than the reference duty ratio.

Flowcharts shown in FIGS. 4 to 6 are used to describe an example of processing of main components of the control unit 109 and the duty monitor 1 according to the embodiment of the invention when the control unit 109 and the duty monitor 1 are configured of a microcomputer, and actual processing program can be modified according to a known method. Accordingly, the control unit 109 and the duty monitor 1 are not limited to the microcomputer and can be also formed using an analog circuit so that they are adapted to configurations shown in FIG. 1 and FIGS. 4 to 6.

As described above, in the embodiment, the cycle of the PWM signal can be prolonged when the capacitive load is connected and the on-time of the PWM signal for driving the field becomes equal to or less than the reference duty ratio. Accordingly, since the timing at which the transistor 110 is turned on and the field current flows is unlike to coincide with the timing at which the cancel transistor 10 is turned on in response to that the transistor 110 is turned off and the cancel current Ir flows, it can be suppressed that the output voltage is excessively increased by an excessive increase of the field current. With this configuration, excessive voltages of the capacitive load and the smoothing capacitor 113 can be prevented.

REFERENCE SIGNS LIST

1 . . . duty monitor
2 . . . PWM signal thinning out unit
10 . . . cancel transistor (second switching device)
11 . . . PWM second drive unit
20 . . . voltage comparator
21 . . . drive unit
100 . . . generator
102 . . . field winding
103 . . . generator winding
104 . . . excitation winding
107 . . . AVR
109 . . . controller
110 . . . transistor (first switching device)
112 . . . the flywheel diode
113 . . . smoothing capacitor

The invention claimed is:

1. An output control apparatus of a generator including a generator winding and an excitation winding wound around a stator side, a field winding wound around a rotor rotated by a drive source, a rectifier for rectifying a current generated by the excitation winding, a smoothing capacitor for smoothing an output current of the rectifier and inputting the smoothed output current to the field winding, a first switching device connected to the field winding and PWM controlled to converge an output voltage of the generator winding to a target voltage, and a flywheel diode connected to the field winding, the output control apparatus of a generator comprising:
a second switching device connected in parallel to the flywheel diode and driven in a phase reverse to a phase of the PWM controlled drive signal;
a duty ratio monitoring unit which determines whether a duty ratio of a drive signal of the first switching device is equal to or larger than a reference duty ratio; and
PWM output cycle extension unit which prolongs an output cycle of the drive signal when the duty ratio monitoring unit determines that a duty ratio of the drive signal is not equal to or larger than the reference duty ratio longer than the output cycle of the drive signal when the duty ratio monitoring unit determines that the duty ratio of the drive signal is equal to or larger than the reference duty ratio.

2. The output control apparatus of a generator according to claim 1, wherein the PWM output cycle extension unit comprises a drive signal thinning out unit which prolongs the output cycle of the drive signal by thinning out the drive signal at predetermined intervals.

* * * * *